Aug. 20, 1940.   W. H. KRAUSE   2,211,829
UNITARY GUIDING AND LATCHING MEANS FOR AUTOMOBILE HOODS
Original Filed May 18, 1939   2 Sheets-Sheet 1
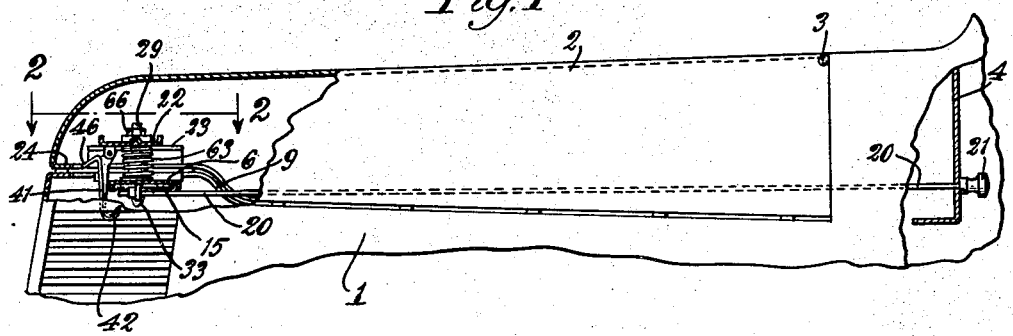
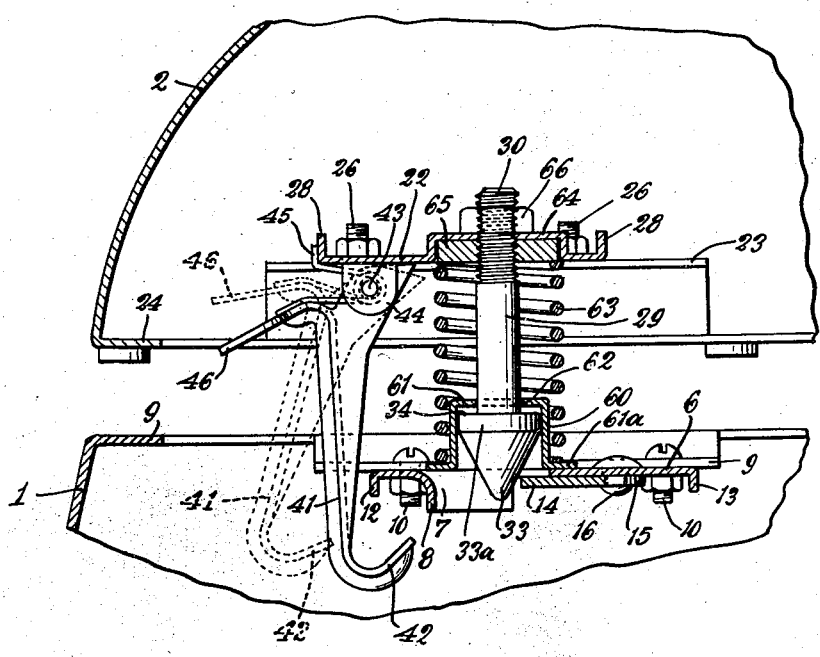
Inventor
Walter H. Krause
by Parker & Carton
Attorneys Aug. 20, 1940.   W. H. KRAUSE   2,211,829
UNITARY GUIDING AND LATCHING MEANS FOR AUTOMOBILE HOODS
Original Filed May 18, 1939   2 Sheets-Sheet 2
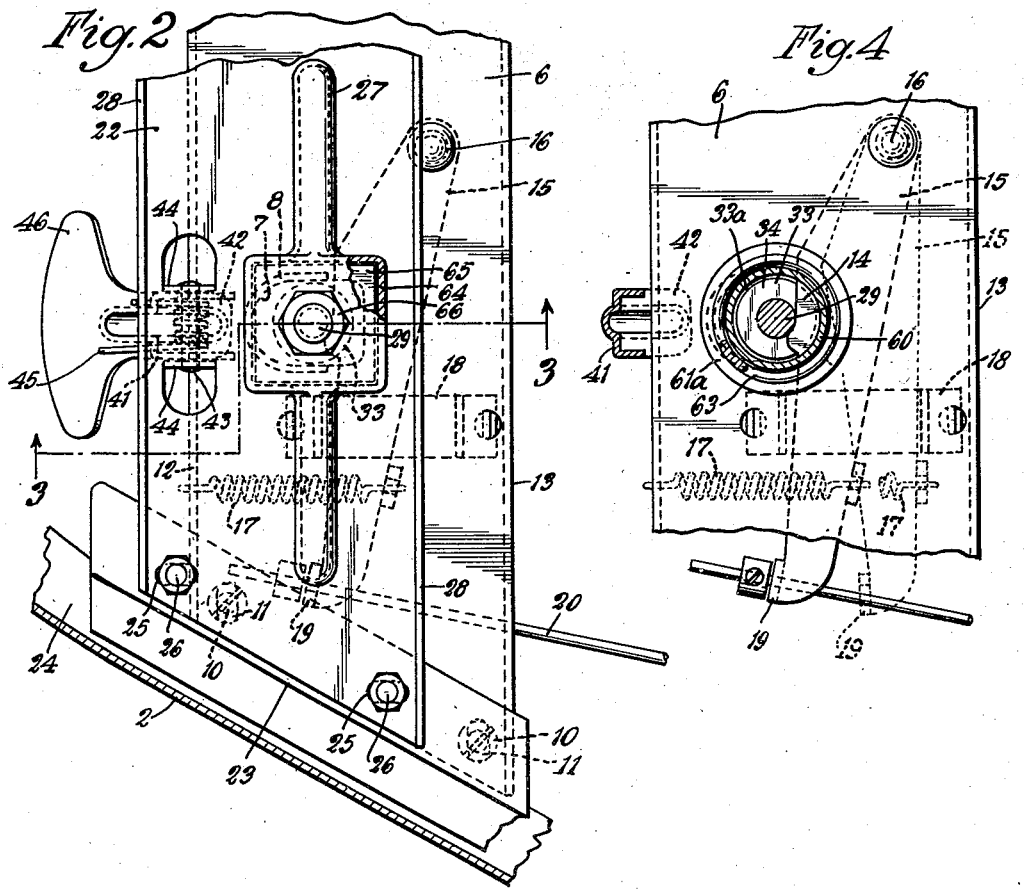
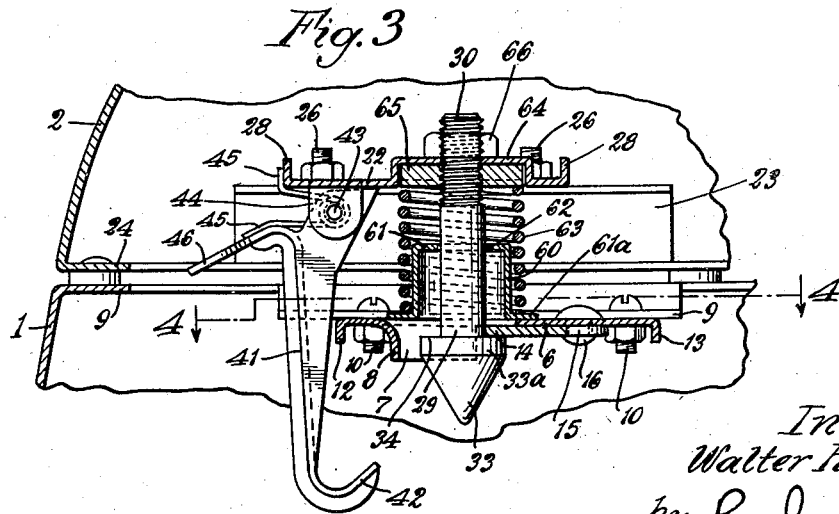
Inventor
Walter H. Krause
by Parker & Carter
Attorneys.

Patented Aug. 20, 1940

2,211,829

UNITED STATES PATENT OFFICE 2,211,829

UNITARY GUIDING AND LATCHING MEANS FOR AUTOMOBILE HOODS

Walter H. Krause, Chicago, Ill., assignor to Chicago Forging & Manufacturing Company, Chicago, Ill., a corporation of Illinois Original application May 18, 1939, Serial No. 274,315. Divided and this application December 1, 1939, Serial No. 307,050

11 Claims. (Cl. 292—227)

My invention relates to an improvement in latches and has for one purpose the provision of an improved latch for the closure of an automobile hood.

Another purpose is the provision of a latch assembly which shall be compact, easy to manufacture, and efficient in use.

Another purpose is the provision of means unitarily applicable to an automobile hood and hood closure having primary latching means, secondary safety latching means, and means for lifting the hood closure a predetermined distance in response to release of the primary latching means and prior to the release of the secondary safety latching means.

Another purpose is the provision of improved means for guiding the downward movement of the hood and latching means into latching position.

Other purposes will appear from time to time in the course of the specification and claims.

The present application is a division of my copending application Serial No. 274,315, filed in the United States Patent Office on May 18, 1939.

I illustrate my invention more or less diagrammatically in the accompanying drawings wherein:

Fig. 1 is a side elevation with parts in vertical longitudinal section;

Fig. 2 is a section on the line 2—2 of Fig. 1;

Fig. 3 is a section on the line 3—3 of Fig. 2;

Fig. 4 is a section on the line 4—4 of Fig. 3; and

Fig. 5 is a section similar to Fig. 3, illustrating the hood closure in raised position.

Like parts are indicated by like characters throughout the specification and drawings.

Referring to the drawings, 1 generally indicates an automobile hood and 2 a closure therefor, transversely and horizontally hinged at its rear end as at 3. It will be understood, however, that the hinge shown is diagrammatic and that any suitable mounting for the rear end of the closure 2 may be employed. 4 generally indicates the instrument panel of the vehicle. It will be understood that in the claims, however, I may employ the term "hood" to indicate the hood closure 2, since it cooperates with the normally fixed portion 1 to constitute a complete hood or enclosure for the engine.

Mounted on the hood 1 is a member which I may call a bottom plate, generally indicated at 6 and shown in some detail for example in Figs. 2 and following. It is illustrated as having a transversely elongated aperture 7 surrounded by a downwardly turned flange 8. The plate 6 may be mounted in any suitable fashion upon the hood 1. I illustrate for example flanges 9 at each side of the hood 1 to which the plate 6 may be secured by bolts 10 or by any other suitable securing means.

Any suitable adjusting slots may be provided on the plate 6, as shown for example at 11 in Fig. 2. Preferably the plate 6 is mounted for lateral adjustment, the slots 11 being laterally or transversely elongated, whereby the aperture 7 may be aligned with the latching means below described. 12 indicates a downwardly turned flange adapted to receive the secondary or safety latching member below described. An additional rearward reinforcing flange 13 may be provided.

Mounted on the lower side of the palte 6 I illustrate a latch member 14 shown as formed of sheet metal and mounted on or forming part of a lever 15 pivoted as at 16 for rotation about a vertical pivot and urged by a spring 17 toward latching position. 18 is any suitable retaining member for the lever 15 which may be secured to the bottom of the plate 6. 19 is a downwardly projecting lug on the end of the lever 15 which is adapted to receive any suitable operating element or rod 20 which terminates in any suitable operating handle member diagrammatically shown at 21. The member 21 may be mounted on or adjacent the instrument panel 4 of the vehicle, in a position convenient to the driver's seat.

22 indicates a transversely extending plate mounted on the hood closure 2, for example upon intermediate brackets 23 secured upon the inturned lower edges or flanges 24 of the hood closure 2. It will be understood, of course, that any suitable securing and supporting means may be employed. I illustrate the member 22 as mounted for longitudinal adjustment and for that purpose I provide adjusting slots 25 through which pass any suitable securing bolts 26 whereby the member 22 is secured upon the upper inner flanges of the brackets 23. The transversely extending member 22 is upwardly offset as at 27, which offset may serve as a reinforcing means and is not in general essential. It is also provided with reinforcing flanges 28, shown as upwardly extending.

Mounted on the upwardly offset central portion 64 is a combined centering and locking keeper 29, which may for example be formed of rod stock screw threaded as at 30 and held in position by upper and lower nuts 65, 66. It has secured or formed at its lower end a spear head, or downwardly pointed cone 33 having a generally horizontal upper ledge or locking keeper 34 adapted to receive the lever or locking member 15, for example when the parts are in the position shown in Fig. 3.

In order to initially raise the member or closure 2 I illustrate as opposed to the plate 6 a generally cylindrical upwardly extending member 60, with a partial top closure 61, centrally apertured as at 62 to admit therethrough a shank of the guiding member or pin 29, and an outward bottom flange 61a. As will be observed from Fig. 3, the head 33 of the pin is located below the bottom of the cylinder 60 when the parts are in locking position, but the internal diameter of the cylinder is sufficient to permit the head to extend upwardly therethrough. The cylinder 60 serves as an abutment, and as a guiding or positioning means for a coil spring 63, which is compressed between the top surface of the plate 6 and the bottom surface of the upper plate 22, when the hood is closed. The upper plate 22 is shown as recessed as at 64 to receive a square nut or abutment 65 screw threaded on the screw threaded portion of the pin 29. 66 is any suitable nut which serves to lock the above described assembly in position.

I provide a secondary or safety latching means which includes a lever or hook 41 with a latching or hook portion proper 42. The hook member is pivoted as at 43 between ears 44 which may be downwardly struck from the upper transverse plate 22. Any suitable means may be employed for urging the hook 42 normally into vertical alignment with the securing lip 12. I illustrate for example a coil spring 45. The hook is provided also with a finger or handle piece 46, preferably formed integrally therewith, the purpose of which will later appear.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing. For example, whereas I have shown a specific spear shaped rod, it will be understood that variations in form, shape and material may be made without departing from the spirit of my invention.

The use and operation of my invention are as follows:

Referring to the form herein, I provide a compact structure for carrying a lock or latch which holds the closure portion 2 of the hood in final locked position, and an additional latch 41 which permits a limited upward movement of the member 2. For lifting means I provide a spring 63, and a cup-shaped member 60 surrounding the rod 29.

When the member 2 is moved into the closed position in which it is shown for example in Fig. 3, the lever 15, including the latch portion 14, is urged into locking position by its controlling spring, and the parts are firmly locked. When the operator releases the lever 15 by pulling on the handle 21, the spring means 63 are effective to raise the member 2 a predetermined distance. This distance is preferably sufficient to permit the hand of an operator to penetrate beneath the lower edge of the member 2 easily, to contact the handle 46 of the supplemental catch 41. The operator can then, by one unitary movement, lift the member 2 and at the same time rotate the handle 46 sufficiently to move the hook 42 out of vertical alignment with the abutment ledge 12 of the plate 6.

Note that the conic head 33 merges into a cylindrical portion 33a of a length sufficient to engage and provide a proper bearing with the downturned flange 8 of the plate 6. Note that this flange 8 does not entirely surround the aperture penetrated by the head 33, as the latch member 14 cuts in at one side or end of the aperture. The cylindrical portion 33a of the head 33 engages the flange 8 at diametrically opposed sides of the head. The length of the aperture 7 of the plate 6 permits a certain relative movement of the guiding head and the lower plate 6 in a longitudinal direction. This is important in connection with the upward and downward movement of the closure, and particularly where lever supports, compound hinges, or the like, are employed for the rear end of the hood.

In the operation of this device, if it happens that an operator, filling station attendant, or the like, does not slam the member 2 down sufficiently far to move the parts into locking position, no risk of accident is involved if, as the vehicle starts, wind pressure is sufficient to raise the hood, as the safety latch or hook 41 will permit only a relatively slight upward movement of the member 2. However, the lifting movement will be sufficient to be apparent to the operator, who can then stop the car and firmly close the member 2. It is advantageous that, when the member 2 is closed, no outsider can normally obtain access to either the latch lever 15 or to the supplemental catch 41. It is only when the operator releases the lever 15 by pulling on the handle 21 that an outsider can have access to the handle 46, and may thereby lift the member 2. Thus, if the vehicle is locked, with its doors closed, it is safe from any normal tampering.

I claim:

1. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the apertured mounting member and including a portion adapted to engage said keeper in locking relationship when said keeper penetrates said apertured mounting member, and means adjustably mounting one of said mounting members whereby they may have relative adjustment to provide for proper alignment of said keeper and said aperture, said keeper including a stem and a downwardly and inwardly beveled head having a shoulder at the top.

2. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the apertured mounting member and including a portion adapted to engage said keeper in locking relationship when said keeper penetrates said apertured mounting member, and means adjustably mounting one of said mounting members whereby they may have relative adjustment to provide for proper alignment of said keeper and said aperture, said keeper including a stem and a downwardly and inwardly beveled head having a shoulder at the top, said head including a generally vertical walled portion of substantially greater diameter than the stem, and a beveled portion downwardly extending from said vertical walled portion.

3. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the lower side of the apertured mounting member and including a portion adapted to engage said keeper in locking relationship when said keeper penetrates said apertured mounting member, and means adjustably mounting one of said mounting members whereby they may have relative adjustment to provide for proper alignment of said keeper and said aperture, said keeper including a stem and a downwardly and inwardly beveled head having a shoulder at the top, the keeper, when the hood is in closed position, extending sufficiently far through the apertured mounting member to permit the latch to extend above said shoulder, and to engage it in a locking relationship.

4. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the lower side of the apertured mounting member and including a portion adapted to engage said keeper in locking relationship when said keeper penetrates said apertured mounting member, and means adjustably mounting one of said mounting members whereby they may have relative adjustment to provide for proper alignment of said keeper and said aperture, said keeper including a stem and a downwardly and inwardly beveled head having a shoulder at the top, said head being adapted to cam the latch when the hood is moved to closed position, the keeper, when the hood is in closed position, extending sufficiently far through the apertured mounting member to permit the latch to extend above said shoulder and to engage it in a locking relationship.

5. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the lower side of the apertured mounting member and including a portion adapted to engage said keeper in locking relationship when said keeper penetrates said apertured mounting member, and means adjustably mounting one of said mounting members whereby they may have relative adjustment to provide for proper alignment of said keeper and said aperture, said keeper including a stem and a downwardly and inwardly beveled head having a shoulder at the top, said head including a generally vertical walled portion, and a beveled portion downwardly extending from said generally vertical walled portion, said beveled portion being adapted to cam the latch when the hood is moved to closed position, the keeper, when the hood is in closed position, extending sufficiently far through the apertured mounting member to permit the latch to extend above said shoulder and to engage it in a locking relationship, the aperture of the apertured mounting member having wall portions adapted to engage said vertical walled portion of the head when the hood is closed.

6. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the lower side of the apertured mounting member and including a portion adapted to engage said keeper in locking relationship when said keeper penetrates said apertured mounting member, said keeper including a stem and a head at the lower end thereof having a generally cylindrical portion, having an upper shoulder, and a conic portion downwardly extending from said cylindrical portion, the keeper, when the hood is in closed position, extending sufficiently far through the apertured mounting member to permit the latch to extend above said shoulder and to engage it in a locking relationship.

7. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the lower side of the apertured mounting member and including a portion adapted to engage said keeper in locking relationship when said keeper penetrates said apertured mounting member, said keeper including a stem and a generally conic member at the lower end thereof, said head having an upper shoulder, said head, when the hood is in closed position, extending sufficiently far through the apertured mounting member to permit the latch to extend above said shoulder and to engage it in a locking relationship.

8. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the lower side of the apertured mounting member and including a portion adapted to engage said keeper in locking relationship when said keeper penetrates said apertured mounting member, and means adjustably mounting one of said mounting members whereby they may have relative adjustment to provide for proper alignment of said keeper and said aperture, said keeper including a stem and a generally conic head having a shoulder at the top, said head including a generally cylindrical portion, and a conic portion downwardly extending from said generally cylindrical portion, said conic portion being adapted to cam the latch when the hood is moved to closed position, the keeper, when the hood is in closed position, extending sufficiently far through the apertured mounting member to permit the latch to extend above said shoulder and to engage it in a locking relationship, the aperture of the apertured mounting member having wall portions adapted to engage said cylindrical portion of the head when the hood is closed, the aperture of said apertured mounting member being of sufficient length to permit relative longitudinal adjustment of the two mounting members.

9. In a vehicle hood latch assembly for a movable hood having a latch and a keeper, a pair of transversely extending mounting members, one mounted on the hood and the other on a stationary part of the vehicle, said mounting members being adjacent, and superposed when the hood is closed, the keeper having means for mounting it for generally vertical adjustment in relation to one of said mounting members, the other mounting member having an aperture to receive it, the latch being mounted on the apertured mounting member and including a portion adapted to engage said keeper in locking relationship when said keeper penetrates said apertured mounting member, and means adjustably mounting one of said mounting members whereby they may have relative adjustment to provide for proper alignment of said keeper and said aperture, said keeper including a stem and a generally regular conic head having a shoulder at the top.

10. In a vehicle hood latch assembly for a movable hood having a latch and a keeper, a pair of transversely extending mounting members, one mounted on the hood and the other on a stationary part of the vehicle, said mounting members being adjacent and superposed when the hood is closed, the keeper having means for mounting it for generally vertical adjustment in relation to one of said mounting members, the other having an aperture to receive it, the latch being mounted on the apertured mounting member and including a portion adapted to engage said keeper in locking relationship when said keeper penetrates said apertured mounting member, said keeper including a stem and a downwardly and inwardly beveled head having a shoulder at the top, the shouldered part of the head being of substantially greater diameter than the stem, the margin of the mounting member defining the keeper receiving aperture having a downwardly extending flanged portion adapted to aid in guiding the keeper.

11. In a vehicle hood latch assembly for a movable hood having a latch and a keeper, a pair of transversely extending mounting members, one mounted on the hood and the other on a stationary part of the vehicle, said mounting members being adjacent and superposed when the hood is closed, the keeper having means for mounting it for generally vertical adjustment in relation to one mounting member, the other having an aperture to receive it, said keeper including a stem and a downwardly and inwardly beveled head having a shoulder at the top, the shouldered part of the head being of substantially greater diameter than the stem and providing a substantial bolt engaging ledge extending about the head, the latch being mounted on the apertured plate and including a bolt portion adapted to engage the ledge of the keeper head in locking relationship when the keeper head penetrates said apertured plate.

WALTER H. KRAUSE.